No. 887,864. PATENTED MAY 19, 1908.
M. C. STEESE.
HOSE AND PIPE COUPLING.
APPLICATION FILED AUG. 29, 1907.

WITNESSES.
J. R. Keller
F. W. Kay

INVENTOR.
Marcus Cassidy Steese,
By Kay, Totten & Winter
His Attys

UNITED STATES PATENT OFFICE.

MARCUS CASSIDY STEESE, OF STEUBENVILLE, OHIO.

HOSE AND PIPE COUPLING.

No. 887,864.　　　Specification of Letters Patent.　　　Patented May 19, 1908.

Application filed August 29, 1907. Serial No. 390,576.

*To all whom it may concern:*

Be it known that I, MARCUS CASSIDY STEESE, a resident of Steubenville, in the county of Jefferson and State of Ohio, have invented a new and useful Improvement in Hose and Pipe Coupling; and I do hereby declare the following to be a full, clear, and exact description thereof.

This invention relates to pipe and hose couplings, and the object is to provide a coupling of simple construction in which the parts can be quickly connected and in a manner to provide a tight joint.

Ordinarily pipe and hose couplings have the parts connected by ordinary screw threads and these require considerable time in order to connect and disconnect the parts. It has been proposed to cut away the threads at two or more points so that the sections of the coupling can be slipped together and locked by giving them a part turn. When ordinary threads are so cut away it is necessary to have the sections in a given position, otherwise the ends of the threads will abut instead of having a thread enter a groove.

The object of this invention is to provide a coupling of the character last described, namely, one having the threads cut away at two opposite points, and so constructed that the parts can be locked, no matter in what position the sections may be assembled. This object is accomplished by providing the inter-locking sections with what are known as double threads.

The invention also comprises ball and socket meeting faces on the two pipe sections.

Figure 1:
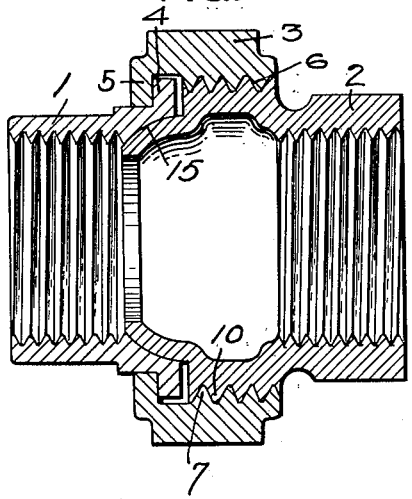
Figure 2:
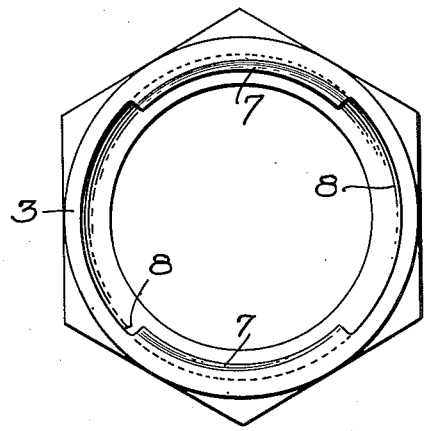
Figure 3:
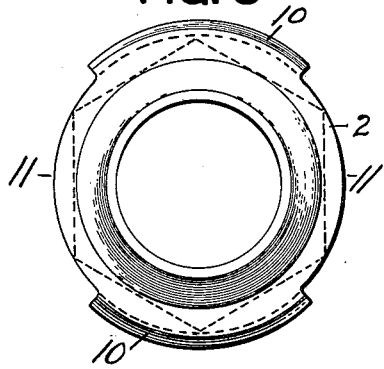
Figure 4:
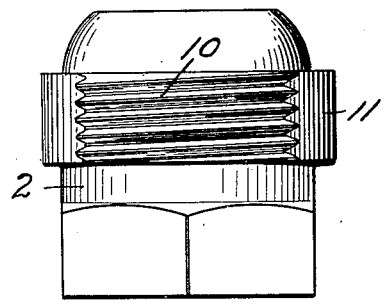
Figure 5:
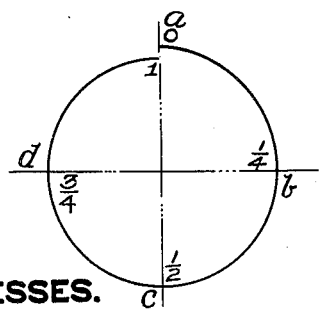
Figure 6:
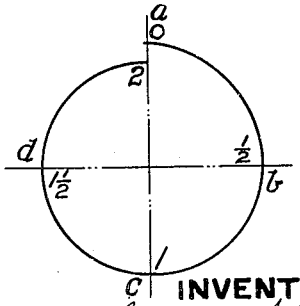

In the accompanying drawing, Figure 1 is a longitudinal section through a pipe coupling constructed according to my invention; Fig. 2 is an end view of the sleeve or collar; Fig. 3 is a similar view of the coöperating pipe section; Fig. 4 is a side view of the said pipe section; and Figs. 5 and 6 are diagrams illustrating the principle of the invention.

The coupling shown comprises two pipe sections 1 and 2, and a coöperating sleeve, collar or nut 3. The pipe section 1 is provided with a flange 4, which is engaged by a flange 5 on the sleeve 3, while the pipe section 2 and sleeve 3 are provided with inter-engaging threads 6. Instead of having these threads continuous they are cut away at two opposite ends so as to leave upon each of said members two series of threads extending about a quarter of the way of the circumference, and with intermediate spaces of substantially the same length. The segments of threads on the sleeve are internal, being indicated at 7, and the blank spaces indicated at 8, Fig. 2, while on the pipe section the thread segments are external, being shown at 10, and the blank spaces at 11 in Fig. 3. The threads on the segments 7 and 10, instead of being single threads, are what are known as double threads, that is, two parallel threads cut simultaneously, so that each thread has a double pitch, that is, for each turn around the member it progresses for twice the width of the thread. Such threads are well known, and need no explanation.

The sections are coupled by slipping the pipe member 2 into the sleeve or collar 3, the thread segments 10 on the pipe section passing down in the blank spaces 8 in the sleeve and the thread segments 7 of the sleeve passing over the blank spaces 11 of the pipe section. The parts are then given approximately a quarter rotation and are thereby locked togteher. By reason of having double threads on these sections, the locking can be effected no matter in which position the parts are assembled, whereas with single threads the parts could not be locked unless assembled in a given position. This is explained by the diagrams shown in Figs. 5 and 6. Fig. 5 is intended to illustrate an ordinary single thread. We will say that a thread segment extends from the point $a$ to point $b$, a blank space from $b$ to $c$, another thread segment from $c$ to $d$, and a blank space from $d$ to $a$. It is obvious that the thread progresses one-quarter of a pitch for each quadrant of the circle, so that if its pitch at $a$ is said to be zero, at $b$ it would be one-fourth and at $c$ one-half, and at $d$ three-fourths and at $a$ one, and so on. This holds true for the thread on both the pipe section and the sleeve or nut. Consequently, if the sleeve and nut be assembled so that one of the thread segments on the nut has the ends of its threads in position to enter the thread on the pipe section at $a$, then the parts can be rotated and locked. If, however, instead of assembling the parts in this position, they be assembled one-half turn from this position, then the same thread segment on the nut will have to enter the thread on the pipe section at position $c$. At this position, however, the thread on the pipe section has advanced one-half a pitch, consequently, instead of presenting a groove in line with the end of the thread on the nut, it will present the end of a thread, and the parts cannot be rotated and interlocked. By having double threads this is avoided, since if at $a$ (Fig. 6) the pitch be considered to be zero, at $b$ it is one-half, at $c$ one, and at $d$ one and one-half, and at $a$ two, etc. Consequently, the thread has advanced one full pitch from $a$ to $c$, thus presenting at $c$, as well as at $a$, a groove in line with the thread on the opposing member. The result is that the members can be slipped together in any of the two positions in which they are capable of going together, and can then be locked, instead of having to be assembled in one of these two positions, as with a single thread.

Since the flanges 4 and 5 are liable not to be quite true, and in order to insure a tight joint notwithstanding, the meeting faces of the two pipe sections are formed as cup and ball, as shown at 15, Fig. 1. Any slight irregularity in the flanges, therefore, does not affect the formation of a tight joint at this point.

While I have shown standard V shaped threads, it will be understood that any other form of thread or spiral rib can be used. All such modifications are intended to be within the terms of the claims hereinafter made.

What I claim is:—

1. A coupling comprising two tubular members and a coupling member, one tubular member and the coupling member being each provided with two series of threads extending substantially one-fourth of the circumference, and with intermediate blank spaces of similar length, the threads on one of said members being external and the other internal, and the threads on both of said members being of double pitch.

2. A coupling comprising two tubular members and a coupling member, the two tubular members having ball and socket meeting faces, and one tubular member and the coupling member being each provided with two sections of threads extending for substantially one-fourth of the circumference and intermediate blank spaces of substantially the same length, the threads on one of said members being external and on the other being internal, and the threads on both of said members being of double pitch.

In testimony whereof, I the said MARCUS CASSIDY STEESE have hereunto set my hand.

MARCUS CASSIDY STEESE.

Witnesses:
CHAS. E. FOWLER,
EBEN D. MOON.